US012617439B2

(12) United States Patent
Mian

(10) Patent No.: US 12,617,439 B2
(45) Date of Patent: May 5, 2026

(54) TRANSPORTATION OPERATION FAULT DETECTION

(71) Applicant: International Electronic Machines Corp., Troy, NY (US)

(72) Inventor: Zahid F. Mian, Loudonville, NY (US)

(73) Assignee: International Electronic Machines Corp., Troy, NY (US)

( * ) Notice: Subject to any disclaimer, the term of this patent is extended or adjusted under 35 U.S.C. 154(b) by 521 days.

(21) Appl. No.: 17/554,493

(22) Filed: Dec. 17, 2021

(65) Prior Publication Data

US 2022/0194448 A1     Jun. 23, 2022

Related U.S. Application Data

(60) Provisional application No. 63/127,606, filed on Dec. 18, 2020.

(51) Int. Cl.
| | |
|---|---|
| *G01L 5/00* | (2006.01) |
| *B61L 23/04* | (2006.01) |
| *B61L 25/02* | (2006.01) |
| *B61L 27/57* | (2022.01) |

(52) U.S. Cl.
CPC ............. *B61L 27/57* (2022.01); *B61L 23/045* (2013.01); *B61L 25/021* (2013.01); *G01L 5/0052* (2013.01)

(58) Field of Classification Search
CPC ...... B61L 27/57; B61L 23/045; B61L 25/021; B61L 25/023; B61L 1/04; B61L 1/06; G01L 5/0052
See application file for complete search history.

(56) References Cited

U.S. PATENT DOCUMENTS

| | | | | |
|---|---|---|---|---|
| 5,129,606 A | * | 7/1992 | Rodems ................. | B61L 1/166 |
| | | | | 246/247 |
| 2005/0066743 A1 | * | 3/2005 | Pieper ...................... | B61L 1/06 |
| | | | | 73/849 |
| 2008/0304065 A1 | * | 12/2008 | Hesser ................... | E01B 35/00 |
| | | | | 356/400 |
| 2009/0049936 A1 | * | 2/2009 | Mian ..................... | G01M 17/10 |
| | | | | 73/865.8 |
| 2009/0057495 A1 | * | 3/2009 | Beaman ................. | B61L 23/00 |
| | | | | 246/1 C |
| 2014/0110535 A1 | | 4/2014 | Bartonek | |
| 2016/0207552 A1 | * | 7/2016 | Mian ................... | B61L 15/0072 |
| 2020/0023871 A1 | * | 1/2020 | Snyder ................ | B61L 25/021 |

(Continued)

FOREIGN PATENT DOCUMENTS

KR          101915500 B1     11/2018

OTHER PUBLICATIONS

Pita Priegue, Miguel, EP Application No. 21215785.3, European Search Report, Apr. 7, 2022, 10 pages.

(Continued)

*Primary Examiner* — Khoi H Tran
*Assistant Examiner* — Tien Minh Le
(74) *Attorney, Agent, or Firm* — LaBatt, LLC

(57)          ABSTRACT

An impact load detector can include a rigid object affixed to a structure for which an impact is to be evaluated. The detector can include one or more sensors which are configured to acquire impact data corresponding to an effect the impact on the structure has on the rigid object. The detector can include a data processor that processes the impact data to evaluate for a presence of a set of faults.

20 Claims, 5 Drawing Sheets

(56)                         References Cited

U.S. PATENT DOCUMENTS

2021/0278309 A1 *    9/2021   Lefebvre .............. F16M 13/02
2022/0063685 A1 *    3/2022   Braren ................... B61L 27/57

OTHER PUBLICATIONS

Jelena Aksentijevic et al., "Realisierung von Checkpoint-Losungen
bei der OBB-Infrastruktur AG—The implementation of checkpoint
solutions at OBB-Infrastruktur AG", Signal Und Draht: Signalling
& DataCommunication, vol. 110, No. 4, Apr. 10, 2018, pp. 12-26.
Office Action for European Patent Application No. 21215785.3, Jul.
3, 2025, 8 pages.

* cited by examiner

TRANSPORTATION OPERATION FAULT DETECTION

REFERENCE TO RELATED APPLICATIONS

The current application claims the benefit of U.S. Provisional App. Ser. No. 63/127,606, which was filed on 18 Dec. 2020, and which is hereby incorporated by reference.

TECHNICAL FIELD

The disclosure relates generally to evaluation of impacts, and more particularly, to impact load detection and evaluation in transportation-related applications.

BACKGROUND OF THE INVENTION

Railroad wheels in good operating condition will travel easily down a rail, evenly imparting the pressure of their load along the rail and doing so with minimal impact and vibration. However, it is common for braking to cause the development of "slid flats" or flat spots on the running surface or tread of the wheel. Such flat spots, when rotating with the wheel, can repeatedly deliver blows to the rail, which cause undue stress to the rail and, equally, to the wheel and other associated components of the rail vehicle.

These stresses increase, naturally, depending on the extent and depth of the flat spot. Those flat spots above a certain size can cause significant wear and tear on the rail and the wheel and may lead to dangerous failures. Early detection of these faults is vital to minimize the damage.

However, inspection of each wheel is a painstaking and slow process. As a result, the rail industry developed a wheel impact load detection (WILD) system. In the North American market, the first WILD system was introduced in the late 1980s. The system consists of a set of strain gauges that are welded to the track. Multiple cribs (up to 8) are instrumented with strain gauges welded to both sides of the railway track. Welding is time-consuming, and typically takes two days or more, as each location on the track to be instrumented must be ground clean and smoothed for good weld adhesion. Once in place, strain gauges can break off of the track due to track bending in service. The only way such a system can be repaired is to repeat the cleaning and welding process.

The inventor recognizes several major issues faced by the current approaches to deploying WILD systems.

For example, each WILD system has a long installation time which includes welding strain gauges to the track. Similarly, repair work at an installation, such as repairing a failed strain gauge, also requires temporary closure of the track for a significant period. As a result, both installation and repairs require a long train traffic disruption (downtime) which is not always practical in active traffic locations. Furthermore, in both cases, a certified, trained strain-gauge welder is needed, and may have to be brought to the area, incurring additional delay and expense. Still further, current WILD system implementations lack redundancy. As a result, when one or more strain gauges fail, the WILD system has to ignore valuable data or be taken offline. Lack of redundancy in the current WILD design and implementation negates present day market need for high availability WILD systems and increases the likelihood of track closures due to repair work.

Additionally, track work at a location of a WILD system installation nearly always results in a complete removal of the system, necessitating another installation. Similarly, repositioning a WILD system can only be accomplished by physical removal of the strain gauges from one set of rails and installation of the strain gauges—in the same time-consuming manner—in the new location. In effect, it is not practical to actually move a system. Rather, the only practical option is to install a new system at the new location.

Present day WILD systems also require extensive wayside electronics which must be wired to the track mounted strain gauges. Due to limitations in low level strain gauge signals, the wayside equipment cannot be located more than a few tens of feet away. These wayside electronics encroach on the track clearance and require a large amount of installation space.

Additionally, current WILD systems only measure the vertical impact forces imparted on the rail by defective wheels, ignoring other forces, such as abnormal accelerations, which can be imparted by defective wheels. Therefore, a number of defective wheels go undetected. These abnormal accelerations imparted by defective wheels are commonly observed in transit operations, mixed freight-transit operations, etc.

SUMMARY OF THE INVENTION

In view of the above, the inventor proposes an impact load detection system that can address one or more of the limitations described herein. Embodiments of the system can improve the ease and speed of installation, e.g., by incorporating a strain gauge into a component that can be reversibly affixed to a monitored structure, such as a railroad track or a bridge support. Embodiments also can improve the ease and speed of repair and upgrading systems by using a modular design. Embodiments can reduce the need for repairs and amount of down time by including redundancy in the design to permit continued operation even after minor failures. Embodiments can incorporate track-mounted components with on board data processing, which can reduce the need for nearby electronics. Electronics can be located further away and communicate using communications technology such as Ethernet and/or Internet of Things (IoT) connections.

Embodiments also can measure and evaluate accelerations caused by rail wheels or other types of events, such as collisions, which can enable the system to detect other problems that may be of concern in the transportation industry.

In an illustrative embodiment, an enclosure incorporating a strain gauge and accelerometer is affixed to a railroad track in such a fashion as to provide WILD functionality with significantly improved ease of installation and operation over existing WILD system designs.

Aspects of the invention provide an impact load detector, which can include a rigid object affixed to a structure for which an impact is to be evaluated. The detector can include one or more sensors which are configured to acquire impact data corresponding to an effect the impact on the structure has on the rigid object. The detector can include a data processor that processes the impact data to evaluate for a presence of a set of faults.

A first aspect of the invention provides an impact load detector comprising: a rigid object affixed to a structure for which an impact is to be evaluated; a set of sensors for acquiring impact data corresponding to an effect the impact on the structure has on the rigid object; and a data processor configured to process the impact data to evaluate for a presence of a set of faults.

A second aspect of the invention provides a rail wheel evaluation system comprising: an impact load detector comprising: a rigid object affixed to a rail for which an impact is to be evaluated; a set of sensors for acquiring impact data corresponding to an effect the impact on the structure has on the rigid object; and a data processor configured to process the impact data to evaluate for a presence of a set of faults; and a remote processing system, wherein the remote processing system is configured to process data corresponding to at least one of: an impact event or the presence of at least one of the set of faults, received from the impact load detector.

A third aspect of the invention provides a method of evaluating an impact on a structure, the method comprising: affixing a rigid object to a structure for which an impact is to be evaluated; acquiring, using a set of sensors associated with the rigid object, impact data corresponding to an effect the impact on the structure has on the rigid object; and processing, by a data processor, the impact data to evaluate for a presence of a set of faults.

The rigid object can include opposing ends affixed to the structure or can have one or more structure affixed at any of various locations. In either case, a force that affects the structure can have a similar effect on the rigid object. In an illustrative application, the structure is a rail and the rigid object is attached thereto. In another illustrative application, the structure is a support member of a bridge. In still another illustrative application, the structure is one or more strike plates mounted to the rigid object.

Embodiments can include one or more strain gauges affixed to the rigid object to acquire impact data. In this case, the impact data can include strain data corresponding to a strain experienced by the rigid object due to the impact. Embodiments can include one or more accelerometers affixed to the rigid object to acquire impact data, in which case the impact data can include acceleration data corresponding to an acceleration experienced by the rigid object. An embodiment can use one or more rotary sensors, in which case the impact data can include data corresponding to a rotation of the rigid object due to the impact. Embodiments can include only one or two or more, of such sensors. Furthermore, embodiments can utilize other sensors for acquiring impact data that can be used to evaluate an impact.

One or more aspects of operation of an impact load detector described herein can vary based on temperature. To this extent, embodiments can include one or more temperature sensors to acquire temperature data relating to the impact load detector. The temperature data can be used to compensate impact data for changes in temperature to provide a more accurate evaluation for the presence of one or more faults. Other information can be used to analyze an impact. For example, information relating to a speed of a vehicle responsible for the impact can be used to evaluate the impact.

One or more of various faults can be detected. In a rail environment, the faults can include wheel flat spots, out-of-round wheels, hunting oscillations, dragging equipment, and/or the like. Embodiments can be deployed for use in monitoring impact events in transportation, such as impacts on a bridge structure.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an impact load detector, which can include a rigid object affixed to a structure for which an impact is to be evaluated. The detector can include one or more sensors which are configured to acquire impact data corresponding to an effect the impact on the structure has on the rigid object. The detector can include a data processor that processes the impact data to evaluate for a presence of a set of faults.

Figure 1:
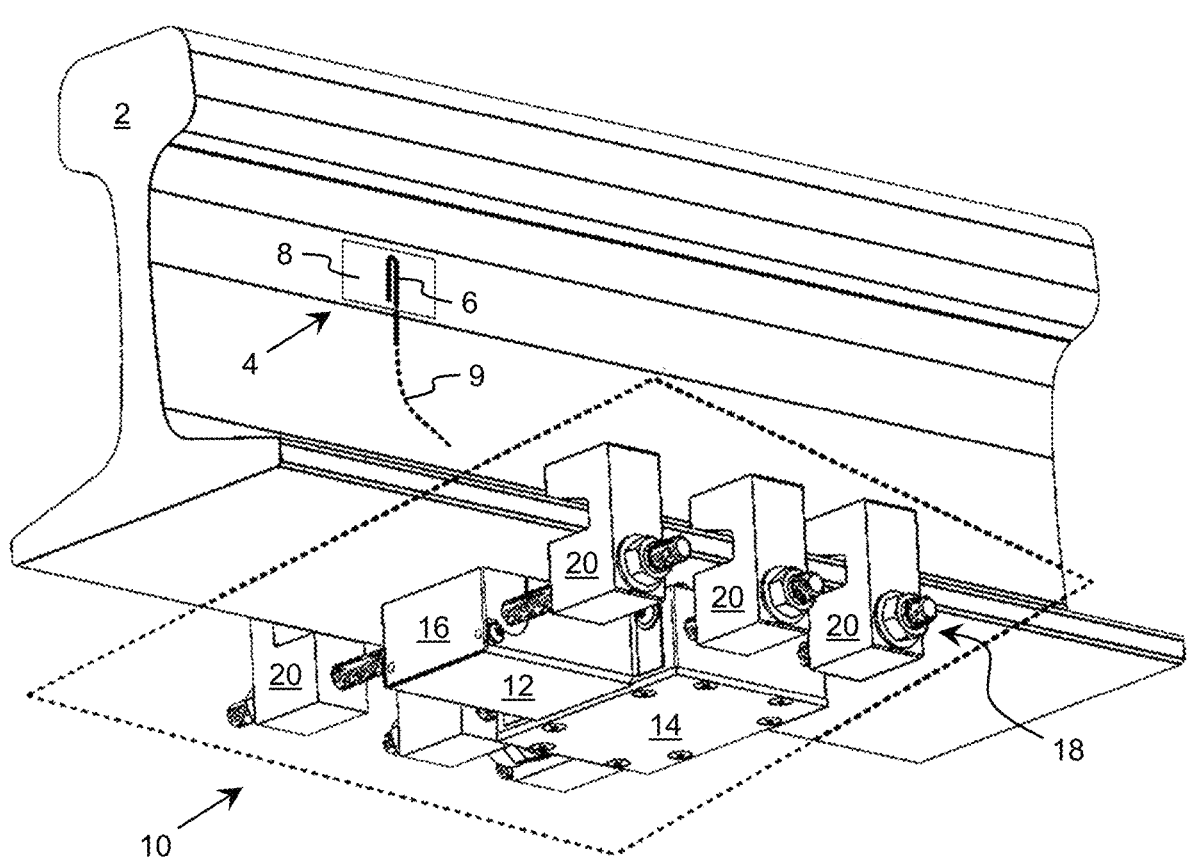
FIG. 1 shows an illustrative rail to which are mounted a prior art wheel impact load detector and an illustrative embodiment of an impact load detector described herein.

Turning to the drawings, FIG. 1 shows an illustrative rail 2 to which are mounted a prior art wheel impact load detector 4 and an illustrative embodiment of an impact load detector 10 described herein.

The prior art wheel impact load detector 4 includes a strain gauge 6 affixed to a plate 8, which is welded to the rail 2. A cable 9 extends from the strain gauge 6 and connects to other components as described herein. As illustrated, the prior art wheel impact load detector 4 is mounted to the web of the rail 2, i.e., the narrowed region located below the head of the rail and above the base of the rail. The prior art wheel impact load detectors 4 can be mounted on the inside facing or outside facing portions of the web of the rail 2.

In contrast, the impact load detector 10 comprises a mounting unit which includes a set of enclosures 12, 14 mounted to the rail 2 using any mounting solution, such as rail clamps 20. The rail clamps 20 can be tightened to effectively make the impact load detector 10 a rigid addition to the rail 2. As illustrated, the rail clamps 20 can mount the impact load detector 10 to a bottom surface of the base of the rail 2. In an embodiment, an enclosure, such as the enclosure 12, is separate from, but connected to a corresponding anchor piece 16, which supports the rail clamps 20 used to secure the enclosure 12 to the rail 2. Each rail clamp 20 can be sized to fit securely to an edge of the base of the rail 2 to securely mount the impact load detector 10 to the rail 2. As illustrated, the rail clamps 20 can be secured to the rail 2 using a solution which allows the impact load detector 10 to be removed, e.g., threaded bolts and nuts 18. However, it is understood that use of the rail clamps 20, an anchor piece 16, and threaded bolts and nuts 18 are only illustrative of various mounting solutions that can be utilized. In illustrative embodiments, the mounting solution uses a mounting approach that is removable (e.g., not welded or otherwise practically permanently affixed).

As illustrated, the impact load detector 10 can include one or more enclosures 12, 14 mounted to an underside of the rail 2. To this extent, the impact load detector 10 can include enclosures 12, 14 sized to fit within a standard gap between two adjacent rail ties. Furthermore, the impact load detector 10 can be partially or totally embedded in the ballast located between the rail ties. In the embodiment shown, the impact load detector 10 is shown including a first enclosure 12 in which one or more sensors can be located, and a second enclosure 14, in which data processing components, interface electronics, and/or the like, can be located. While two enclosures 12, 14 are illustrated, it is understood that embodiments can be implemented which utilize any number of one or more enclosures. While both enclosures 12, 14, are shown mounted below the rail 2, it is understood that this is only illustrative. To this extent, in other embodiments, only the enclosure 12 with the sensors is mounted to the rail 2. In this case, any additional enclosures, such as the second enclosure 14, can be located adjacent to the rail, mounted to another portion of the rail, mounted to a rail tie, and/or the like.

Figure 2:
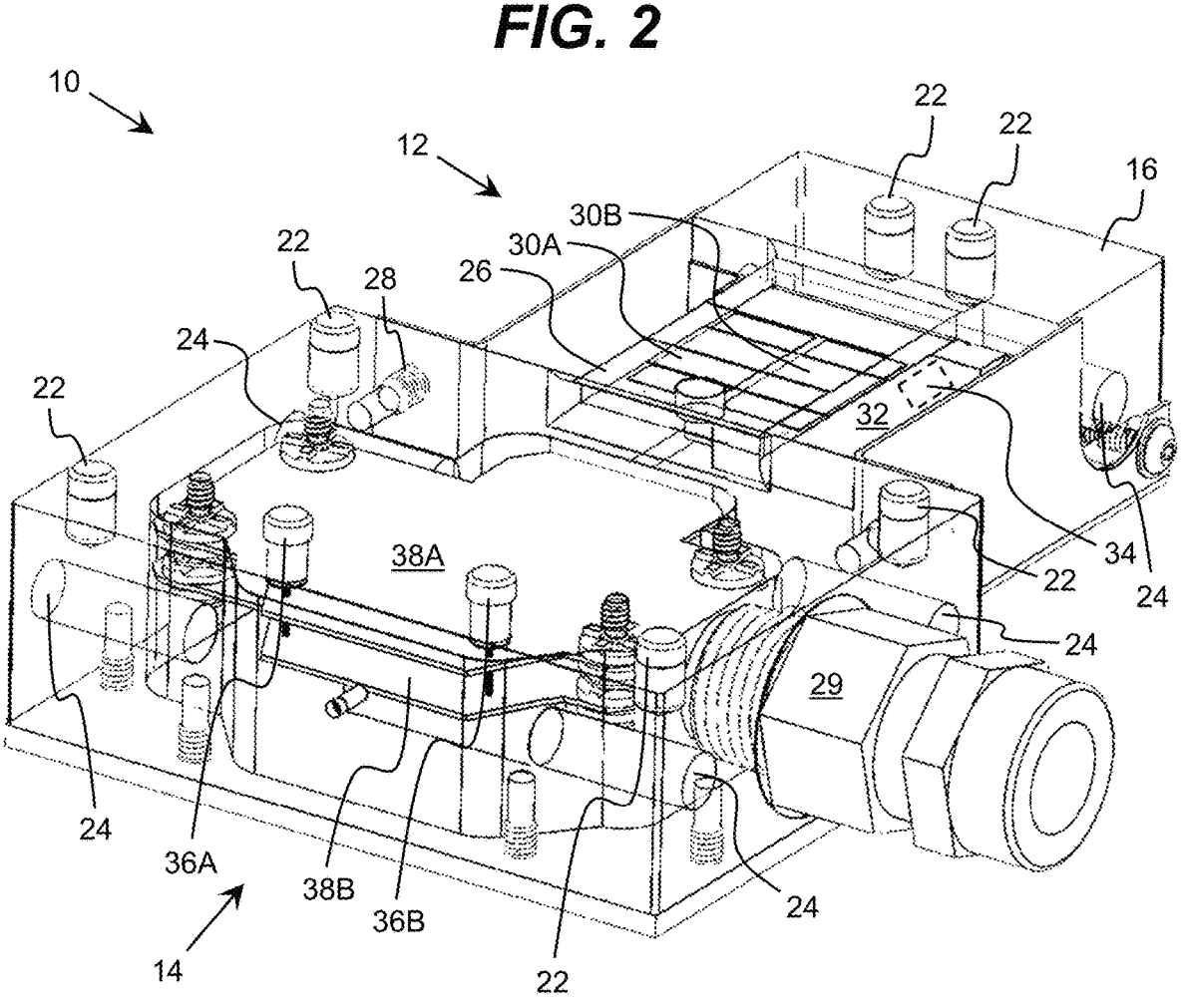
FIG. 2 shows further details of an illustrative impact load detector according to an embodiment.

FIG. 2 shows further details of an illustrative impact load detector 10 according to an embodiment. As illustrated, the anchor piece 16 and the enclosure 14 can include mounting holes 24, which can be configured to enable the impact load detector 10 to be mounted to the rail 2 (FIG. 1), e.g., by the insertion of bolts for securing rail clamps 20 to the base of the rail 2 using nuts as shown in FIG. 1. In the embodiment illustrated, the larger enclosure 14 includes two such mounting holes 24, while the anchor piece 16 can include one mounting hole 24. However, it is understood that this configuration of mounting holes 24 and approach for mounting the impact load detector 10 to the rail 2 is only illustrative of various possible solutions.

In the illustrated embodiment, the anchor piece 16 and enclosure 14 also are shown including studs 22 protruding from a top surface of the impact load detector 10. The studs 22 can be configured to anchor and provide good contact with the underside of the rail 2. Furthermore, the studs 22 can separate the main body of each enclosure 12, 14 from the underside of the rail 2, which is often rough and unsuitable for maintaining tight contact with a housing. Use of the studs 22 also can provide a solution for reliably transferring the pressure/stress exerted on the rail 2 to the anchor piece 16 and the enclosure 14.

The enclosure 14 can be connected to the anchor piece 16 by a rigid object 26, such as a narrow, thin beam. In an embodiment, the enclosure 14, the anchor piece 16, and the rigid object 26 are a single unit. In this case, the enclosure 14, the anchor piece 16, and the rigid object 26 can be machined from a single piece of metal. However, it is understood that the enclosure 14, the anchor piece 16, and the rigid object 26 can be fastened together using any suitable solution for producing a single structure of predictable and reliable rigidity and behavior under the stresses expected to be operative beneath a working rail 2. The rigid object 26 and various sensors located thereon, can be enclosed within the enclosure 12, which can be fastened to the enclosure 14 using any solution, such as screws 28.

The rigid object 26 can provide a mounting surface for one or more of the sensors for the impact load detector 10. For example, the rigid object 26 can include a set of strain gauges 30A, 30B mounted thereon. While two strain gauges 30A, 30B are shown, it is understood that any number of one or more strain gauges can be included. However, the use of two or more strain gauges 30A, 30B can provide functional redundancy, allowing the system to continue to produce useful readings even after the failure of all but one of the strain gauges 30A, 30B.

As discussed herein, the opposing ends of the rigid object 26 are physically attached to the enclosure 14 and the anchor piece 16, each of which is affixed to the rail 2. However, the rigid object 26 can be otherwise unrestrained. The rigid object 26 can be oriented such that a long axis of the rigid object 26 is aligned with and extends approximately in parallel with a long axis of the rail 2. As a result, forces that affect the rail 2 also can affect the rigid object 26. For example, the rigid object 26 will flex along with the rail 2 as rail vehicles pass along the rail 2. The flexing experienced by the rigid object 26 will register as a strain on the strain gauges 30A, 30B, which will be similar to the strain exerted on the rail 2.

In an embodiment, the enclosure 14 includes one or more additional sensors. For example, a circuit board 32 can be mounted to the rigid object 26 and include one or more accelerometers 34. In a more particular embodiment, the impact load detector 10 can include at least two accelerometers 34. Each accelerometer 34 can be a single-axis, two-axis, or three-axis accelerometer, and can provide the capability to detect accelerations as well as strains experienced by the rigid object 26 while rail vehicles travel along the rail 2. Acquisition of acceleration data can enable the system to detect a wider variety of defects. Inclusion of two or more accelerometers 34 can provide functional redundancy, allowing the system to continue to produce useful readings even after the failure of all but one of the accelerometers 34.

The raw data produced by various types of sensors, including strain gauges 30A, 30B and accelerometers 34, can vary based on temperature variations as well as on variations of the precise quantity the sensors are measuring. As a result, the impact load detector 10 can further include a set of temperature sensors 36A, 36B. Each temperature sensor 36A, 36B can comprise any type of temperature sensor, such as a thermistor, a thermocouple, and/or the like. Temperature data acquired by the temperature sensors 36A, 36B can be used to provide temperature compensation for the raw data acquired by one or more other sensors described herein. While the temperature sensors 36A, 36B are shown mounted to the enclosure 14 and extending above the enclosure 14, it is understood that this is only illustrative, and the temperature sensors 36A 36B can be located anywhere within or outside the enclosures 12, 14.

The enclosure 14 can include one or more data processors located therein. For example, the enclosure 14 is shown including a set of circuit boards 38A, 38B which can perform various data processing operations and data transfer operations as described herein. In an embodiment, a first circuit board 38A can be configured to receive, filter, and condition analog data acquired from the various sensors, such as the strain gauges 30A, 30B, the accelerometers 34, the temperature sensors 36A, 36B, and/or the like. The second circuit board 38B can be configured to perform any digital data processing operations and/or data transfer operations. However, it is understood that this configuration of circuit boards 38A, 38B is only illustrative of various possible configurations of one or more circuit boards that can be used for data processing as described herein.

The enclosure 14 also can include a connector 29, which can provide a physical cable connection for transferring data, providing power, and/or the like. However, it is understood that data transfer can be performed using a wireless communications solution. Additionally, there are numerous solutions by which the components of the impact load detector 10 can be powered, including a hardwired connection, a battery, power harvesting light and/or vibration, or any combination, which would result in a reliable supply of power for the components of the system.

Figure 3:
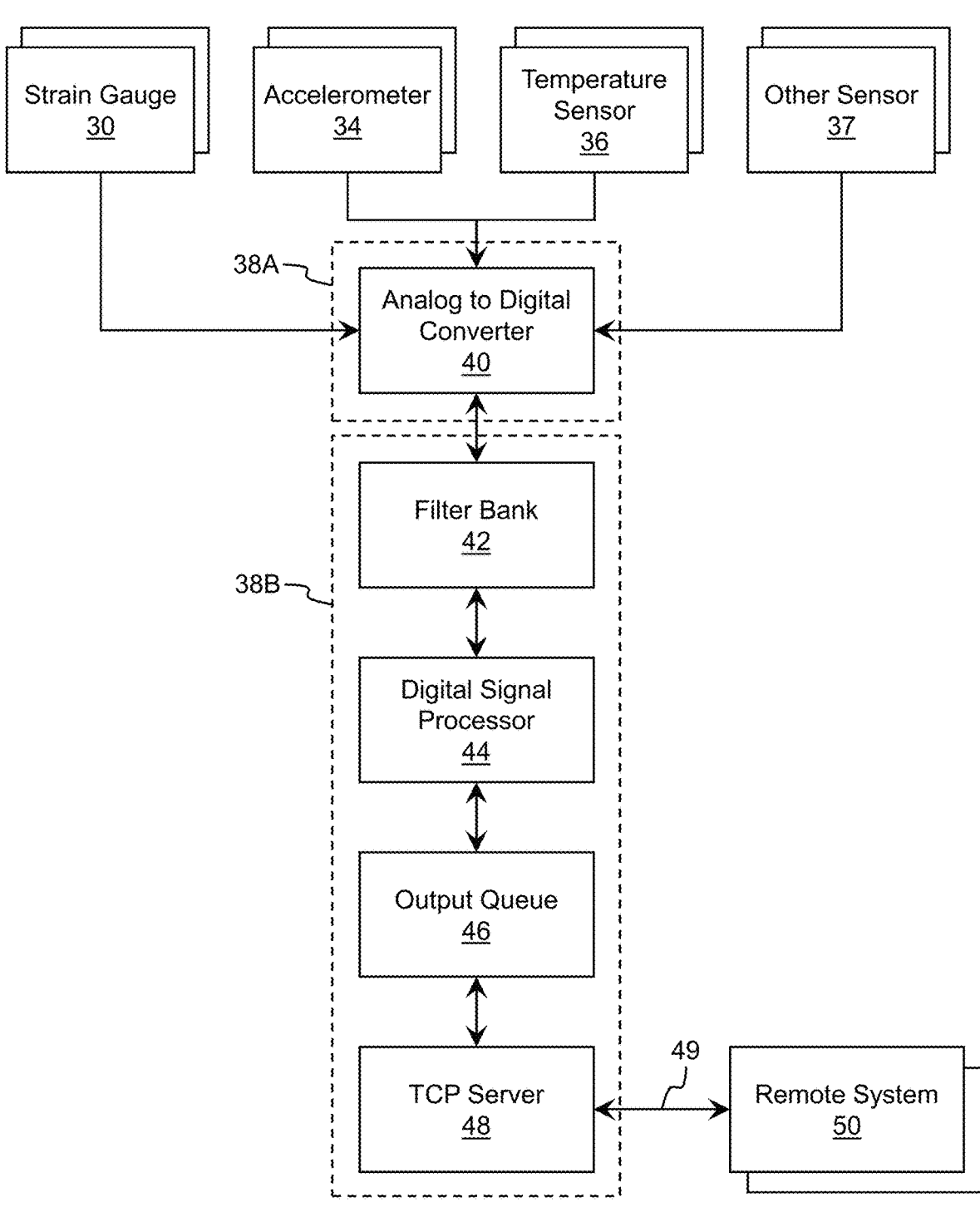
FIG. 3 shows the conceptual operation of an illustrative embodiment of the impact load detector described herein.

FIG. 3 shows the conceptual operation of an illustrative embodiment of the impact load detector described herein. As illustrated, an analog to digital converter (ADC) 40, which can be implemented on the first circuit board 38A shown in FIG. 2, can be connected to and receive data from various sensors, including one or more strain gauges 30, one or more accelerometers 34, one or more temperature sensors 36, and/or one or more other sensors 37. The analog to digital converter 40 can perform analog to digital conversion of the raw sensor data acquired by each of the sensors. However, it is understood that one or more of the sensors can comprise a digital sensor. To this extent, an embodiment of the analog to digital converter 40 can be configured to acquire data from one or more digital sensors.

The analog to digital converter 40 can perform further processing of the data, such as performing simple noise filtering, and/or other preprocessing of the data. In an embodiment, the sensors can have significantly different sampling rates. For example, the temperature sensor 36 can be sampled at a very low rate (e.g., once per minute), while the accelerometer 34 may be sampled at several kHz while a rail vehicle is passing over the rail. As a result, the temperature sensor 36 can use a low speed converter, while the accelerometer 34 can use a high speed converter. To this extent, an embodiment of the analog to digital converter 40 can be configured to accommodate the different sample rates on different channels. Furthermore, an embodiment of the analog to digital converter 40 can comprise multiple converters, each of which can be configured to accommodate a different sample rate.

In any event, the signals from the analog to digital converter 40 can be passed to a filter bank 42 (e.g., implemented on the second circuit board 38B shown in FIG. 2), which can extract various characteristic signatures for analysis. A digital signal processor (DSP) 44 can further process the data and/or prepare some or all of the data for transmission to a remote system 50 for analysis. In an embodiment, once the filter bank 42 and digital signal processor 44 have prepared the data of interest, the data is placed in an output queue 46. Data in the output queue 46 can be sent to a TCP server 48, which can transmit the data for processing on a remote system 50, e.g., through an ethernet connection 49.

As illustrated, data and/or updates also can be received by the impact load detector from a remote system 50. Such a two way connection can enable a remote system 50 to provide software updates, such as modifications to the filter bank 42, new algorithms for data analysis in the digital signal processor 44, and/or the like. Furthermore, a remote system 50 can provide other data for use during onboard data processing by the impact load detector. For example, a remote system 50 can provide wheel sensor data which can permit measurement of the speed of a passing vehicle, a direction of travel of a passing vehicle, and/or the like. This information can assist in rail vehicle and/or rail wheel identification, verification of speed, determination that an unsafe speed is reached, incorrect track usage by a rail vehicle, etc.

Figure 4:
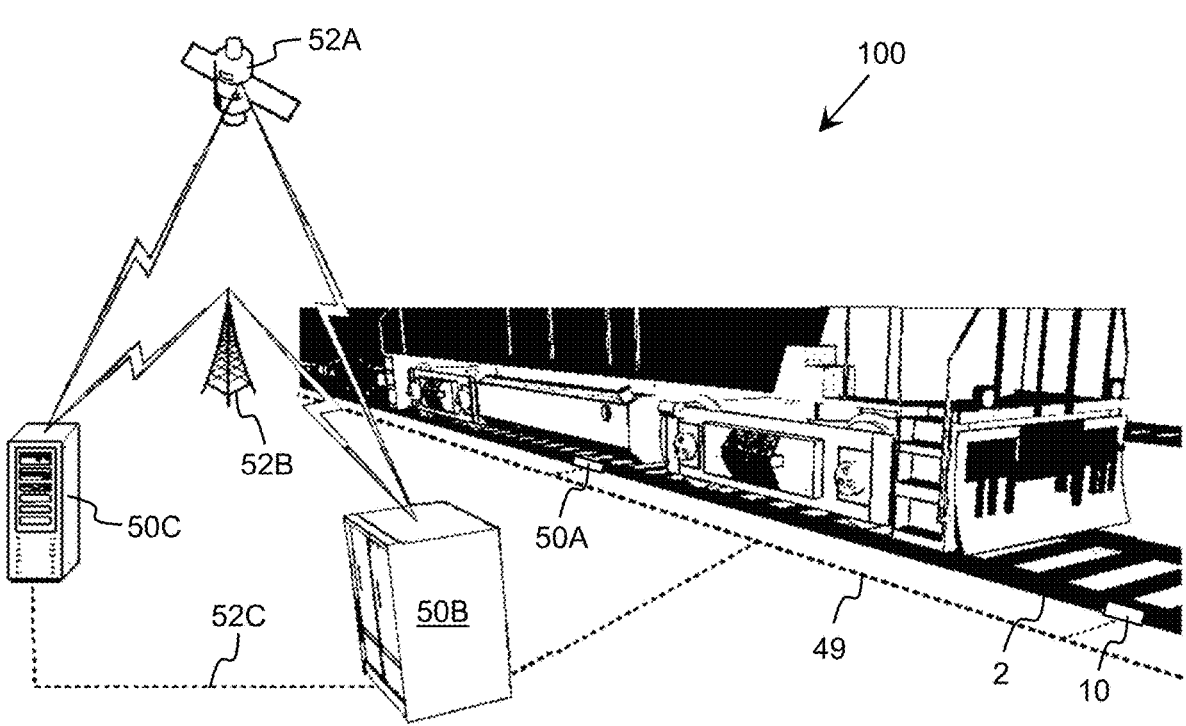
FIG. 4 shows an illustrative rail wheel evaluation system according to an embodiment.

FIG. 4 shows an illustrative rail wheel evaluation system 100 according to an embodiment. As illustrated, a rail 2 can include a sensing device 50A and an impact load detector 10 located adjacent thereto. As a train or one or more rail vehicles travel along the rail 2, the sensing device 50A and the impact load detector 10 can acquire and communicate data to a remote processing system 50B via a shared communications connection, such as an ethernet communications link 49. In an illustrative embodiment, the sensing device 50A comprises a wheel sensor, which can acquire data regarding a speed and/or direction of travel of the rail vehicle(s) and trigger the impact load detector 10 to commence acquiring data in response to a rail wheel being detected. However, it is understood that embodiments can include any of various different sensing devices 50A configured to acquire data regarding any of various aspects of the train operation and/or physical characteristics of the rail vehicles.

The remote processing system 50B can be capable of analyzing the data of the sensing device 50A or the impact load detector 10 in isolation. Furthermore, the remote processing system 50B can combine this data in manners known to those skilled in the art to determine whether a fault is present on a passing rail vehicle. For example, a flat spot on a rail wheel must produce impacts in exact timing with one revolution of its wheel. As a result, the remote processing system 50B can compare the timing of impacts detected by the impact load detector 10 with the speed and spacing of the wheels detected by the sensing device 50A to confirm that the detected impacts correspond with the timing for the wheel revolutions.

It is understood that in addition to detecting a flat spot, the remote processing system 50B can detect one or more other faults that may be present on a rail vehicle. Other illustrative faults include an out-of-round wheel, hunting oscillations, and/or the like. Non-ideal wheel conditions, such as out-of-round and hunting oscillations result in certain specific signatures resulting from impacts to the rail. For example, while a flat spot has a characteristic signature of an abrupt spike in the signal, the out-of-round wheel generates a broader signal with different periodicity ratios to the speed. Hunting oscillations have a different periodicity to speed ratio (less than one signal per rotation of wheel). Using the data described herein, the impact load detector 10 and/or the remote processing system 50B can identify such conditions using any of various known solutions.

In any event, the remote processing system 50B also can evaluate the signals from the impact load detector 10, the sensing device 50A, and/or any other sensors, to verify the functionality of the sensors, or detect any failures. The remote processing system 50B can transmit alerts, raw data, service requests, and/or the like, for processing on a central server 50C in response to the evaluation. As illustrated, the remote processing system 50B can use any of varying communications routes to transmit such alerts to the central server 50C. For example, the remote processing system 50B can use a satellite phone uplink 52A, e.g., when located in a remote area, to contact a communications satellite and establish a downlink to the central server 50C. Similarly, a wireless link 52B, such as a cell phone connection, can be made through a cell tower and provide a communications connection with the central server 50C. Also, a direct land-line connection 52C also can provide connectivity to the central server 158.

While only a single sensing device 50A and impact load detector 10 located adjacent to a single rail 2 are illustrated, it is understood that embodiments of the system 100 can include any number of such devices located adjacent to one or both rails 2, all of which can communicate with the remote processing system 50B and/or each other via a suitable communications connection, such as the ethernet communications link 49. Furthermore, it is understood that a wired communications link for communications between the sensing device(s) 50A, remote processing system 50B, and/or impact load detector(s) 10 is only illustrative.

In particular, placing any form of cabling along stretches of rail (or, potentially, other areas, such as highways) is labor intensive and introduces multiple points of failure into a system which may have many connections between the cable and various devices. Thus, an embodiment of the rail wheel evaluation system 100 can reduce or eliminate communications cabling by configuring some or all of the sensing device(s) 50A and/or impact load detector(s) 10 to communicate with one another and/or the remote processing system 50B using a wireless communications solution. Depending on the location and requirements of the particular rail wheel evaluation system 100, a suitable wireless communications solution may include short-range and/or longer range transmissions, such as Bluetooth, 802.11 WiFi, cellular network connection, and/or any other suitable wireless transmission solution.

While shown and described herein as a method and system for evaluating rail vehicles, and in particular, rail wheels of passing rail vehicles, it is understood that aspects of the invention further provide various alternative embodiments.

For example, one of the major issues facing many road systems, especially those in heavily-traveled areas with much legacy infrastructure, is the damage done to bridges when they are struck by vehicles. This is most commonly caused by large commercial vehicles (trucks, etc.) whose drivers fail to note that they are approaching an overpass with insufficient clearance for their vehicle, but can also include vehicles which lose control and strike major supports for the bridge.

An embodiment of the impact load detector 10 described herein can be configured to detect such an impact event on a bridge. In particular, the impact load detector 10 can be mounted to a support member or the like, of the bridge. A bridge impact will be characterized by a very sharp spike of acceleration or vibration in the bridge, far exceeding that seen in normal usage of the bridge. Upon an impact, the accelerometer(s) 34 can acquire data on the vibration and acceleration, which can be processed by the data processor(s) included in the impact load detector 10 to determine whether the vibration and acceleration data exceed thresholds of magnitude and/or duration in a manner characteristic of a bridge hit. Furthermore, the data processor can perform one or more other forms of analysis to determine or verify a bridge hit and/or quantify a magnitude of the hit.

In addition, the data processor(s) can evaluate other sensor data to determine if any lasting damage has been done to the bridge, which may make the bridge unsafe for continued use or require earlier than scheduled maintenance. For example, the impact load detector 10 can include a tilt sensor, which can detect if the corresponding support member to which the impact load detector 10 is mounted has shifted or bent noticeably. Similarly, the impact load detector 10 can include one or more strain gauges 30, which can enable the data processor(s) to monitor and determine whether the strain in the support member of the bridge has changed following the impact.

In another railroad application, an embodiment of an impact load detector 10 can be configured to detect equipment dragging from a rail vehicle. On occasion, various components of a rail vehicle, such as brake hoses, may break and drag beneath the rail vehicle for considerable distances. As these components, like all components of a rail vehicle, often are moving with considerable speed and are both heavy and strong, such dragging equipment has the potential to cause considerable damage to other objects or components of the railway. To identify such equipment, a Dragging Equipment Detector (DED) can be deployed. However, current art DEDs have significant limitations. An embodiment of the present invention provides a solution to reliably detect dragging equipment in a more efficient, reliable, and rugged fashion than that of current art DEDs.

Figure 5:
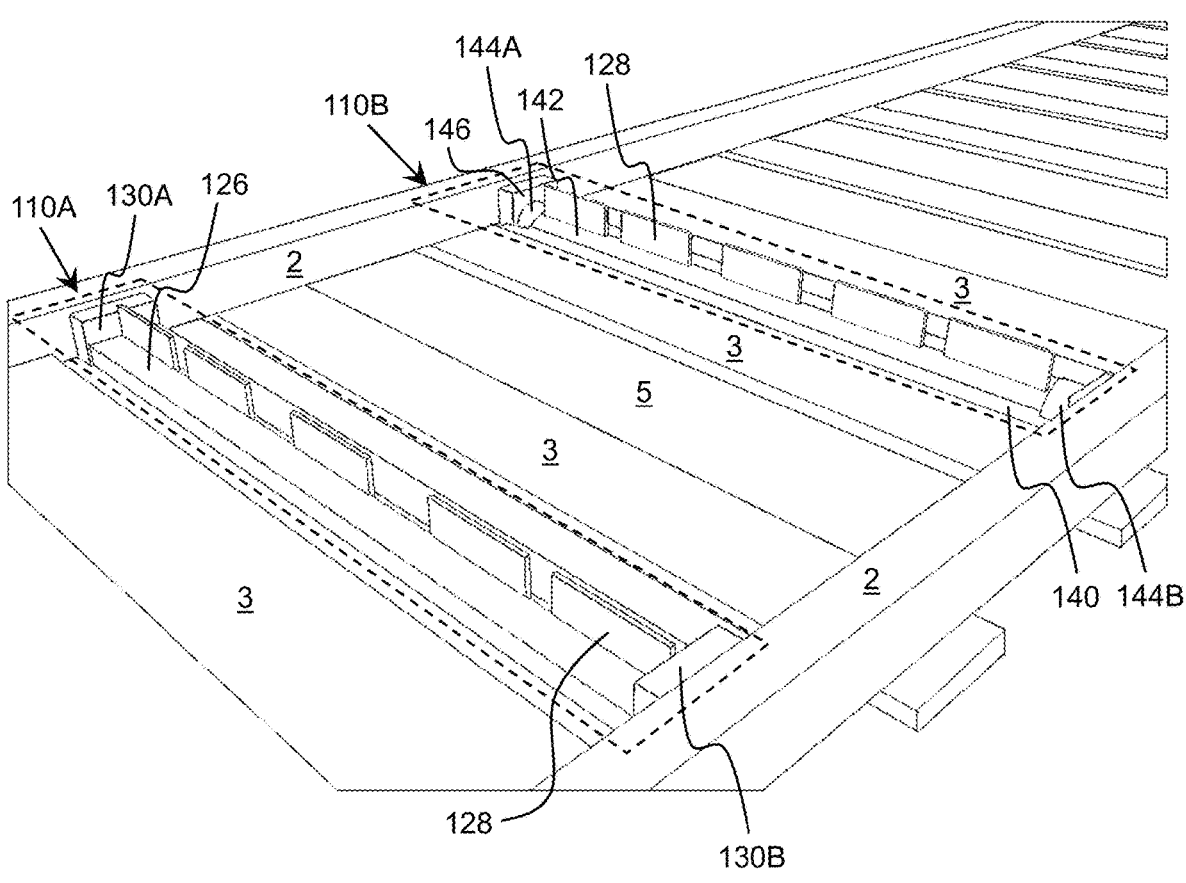
FIG. 5 shows two illustrative dragging equipment detectors according to embodiments.

FIG. 5 shows two illustrative dragging equipment detectors 110A, 1106 according to embodiments. In each embodiment, the dragging equipment detector 110A, 1106 is placed between a pair of rails 2 and between the ties 3 supporting the rails 2, set into the ballast 3 located between the ties 3. Each dragging equipment detector 110A, 1106 can be physically attached to the rails 2 and/or a tie 3 to keep the dragging equipment detector 110A, 1106 firmly in place with respect to the rails 2.

In the first illustrative dragging equipment detector 110A, a strong support or rigid object 126 is provided with a set of strike plates 128 mounted thereto. The rigid object 126 can be at least partially embedded in the ballast 3 and can be physically attached to the rails 2 using any solution, such as the rail clamps described herein. The rigid object 126 can have a height approximately the same or slightly higher than the heights of the ties 3. Each strike plate 128 can be mounted to the rigid object 126 using any solution (e.g., welding) and extend from the top surface of the rigid object 126. The strike plates 128 can have a height that is approximately the same as or slightly higher than the height of the rails 2.

As a rail vehicle with dragging equipment passes the dragging equipment detector 110A, the dragging equipment will strike one or more of the strike plates 128, imparting significant strain and vibration/impact to the rigid object 126. In this embodiment, the dragging equipment detector 110A includes sensing devices 130A, 1306 located on opposing ends of the rigid object 126 which detect the strain and vibration impact. For example, each sensing device 130A, 130B can include one or more accelerometers and one or more temperature sensors. In this case, an accelerometer will acquire data that can be used to detect the impact events on the strike plates 128.

A data processor (such as one described herein) can process the accelerometer data and temperature data to compensate the raw data acquired by the accelerometers for the current temperature. Subsequently, the data processor can analyze the temperature-compensated acceleration data to distinguish between an impact event and routine vibrations caused by the passage of rail vehicles or other normal operation. The data processor can generate an alert and transmit the alert using a wired and/or wireless communications connection as described herein. The dragging equipment detector 110A can include sensing devices 130A, 1306 on both ends of the rigid object 126 as an impact at one end of the structure may not be easily distinguished from normal operation with data acquired by a sensing device 130A, 130B located at the other end of the structure.

In the second illustrative dragging equipment detector 1106, a support structure 140 supports a sensing rigid object 142, which also is equipped with a set of strike plates 128. The sensing rigid object 142 is configured to rotate when any of the strike plates 128 affixed thereto is impacted. Furthermore, the sensing rigid object 142 can include return springs 144A, 144B, which will rotate the sensing rigid object 142 back to its default position following any strike. In the second dragging equipment detector 1106, a sensing device 146 is present at, but not in contact with, an end of the sensing rigid object 142. The sensing device 146 can comprise a noncontact rotary sensor which acquires rotation data corresponding to the rotation of the sensing rigid object 142. The data processor can process the sensed rotation data to determine exact characteristics of the rotation, such as initial acceleration, rotational distance, and/or the like, which the data processor can use to determine an accurate estimate of the size and force of the impact. Based on the size and force of the impact, the data processor can generate and transmit an alert as described herein.

In each embodiment of the dragging equipment detector 110A, 110B, the data processor can be located within a housing, which is located anywhere in the area of the detector 110A, 110B. For example, the data processor can be located adjacent to the rails 2, within the rails 2, within the ballast 5, and/or the like. In an embodiment, the housing can be located within the rigid object 126 or the support structure 140. While not shown for clarity, it is understood that each embodiment of the dragging equipment detector 110A, 110B can be incorporated into a system, such as that shown in FIG. 4. To this extent, operation of both of the dragging equipment detectors 110A, 110B can be enhanced by the addition of data from other sensors, such as the wheel sensor described herein, which can provide speed data to further disambiguate any analysis of impact events.

As used herein, unless otherwise noted, the term "set" means one or more (i.e., at least one) and the phrase "any solution" means any now known or later developed solution. The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art that are exposed to the concepts described herein or in the actual work product, are included within the scope of the invention as defined by the accompanying claims.

What is claimed is:

1. A fault detector comprising:
an enclosure including an object, wherein the enclosure is configured to be affixed to a structure for which a force affecting the structure is to be evaluated, wherein the structure is a single beam, wherein opposing ends of the object are affixed in the enclosure and the object is otherwise unrestrained and a long axis of the object is configured to be spaced from the enclosure and the structure and in parallel with a long axis of the structure;
a set of sensors for acquiring impact data corresponding to an effect the force affecting the structure has on the object; and
a data processor configured to process the impact data to evaluate for a presence of a set of faults.

2. The fault detector of claim 1, wherein the set of sensors includes at least one strain gauge affixed to the object, wherein the impact data includes strain data corresponding to a strain experienced by the object.

3. The fault detector of claim 1, wherein the set of sensors includes at least one accelerometer affixed to the object, wherein the impact data includes acceleration data corresponding to an acceleration experienced by the object.

4. The fault detector of claim 1, further comprising at least one temperature sensor for acquiring temperature data, wherein the data processor is configured to compensate raw impact data acquired by at least one sensor in the set of sensors based on the temperature data, and wherein the data processor uses the compensated impact data to evaluate for the presence of the set of faults.

5. The fault detector of claim 1, wherein the object is a metal beam, and wherein opposing ends of the object are affixed to the structure such that the force that affects the structure has a similar effect on the object.

6. The fault detector of claim 1, wherein the structure is a single rail of a railroad track, and wherein the set of faults includes a rail wheel flat spot.

7. The fault detector of claim 1, further comprising a mounting unit including at least one enclosure including the enclosure, wherein, the set of sensors and the data processor are located within the at least one enclosure.

8. The fault detector of claim 7, wherein the mounting unit includes a plurality of studs configured to separate the at least one enclosure from the single beam.

9. The fault detector of claim 7, wherein the mounting unit includes a plurality of clamps for removably securing the mounting unit to the single beam.

10. The fault detector of claim 1, wherein the data processor is configured to acquire remote sensor data from at least one other sensing device via a wired or wireless communications solution, and wherein the data processor uses the remote sensor data to evaluate for the presence of at least one of the set of faults.

11. The fault detector of claim 10, wherein the beam is a rail of a railroad track or a support member of a bridge, and wherein the remote sensor data comprises data corresponding to a speed of a passing vehicle.

12. The fault detector of claim 1, wherein the data processor is further configured to provide data corresponding to at least one of: an impact event or the presence of at least one of the set of faults, for processing on a remote processing system.

13. A rail wheel evaluation system comprising:
a fault detector comprising:
an enclosure;
an object located within the enclosure, wherein the enclosure is configured to be affixed to a single rail of a railroad track for which a force affecting the single rail is to be evaluated, wherein opposing ends of the object are affixed in the enclosure and the object is otherwise unrestrained and a long axis of the object is configured to be spaced from the enclosure and the structure and in parallel with a long axis of the structure;
a set of sensors for acquiring impact data corresponding to an effect the force affecting the single rail has on the object; and
a data processor configured to process the impact data to evaluate for a presence of a set of faults; and
a remote processing system, wherein the remote processing system is configured to process data corresponding to at least one of: an impact event or the presence of at least one of the set of faults, received from the fault detector.

14. The rail wheel evaluation system of claim 13, further comprising a wheel sensor configured to acquire data regarding a speed of a passing rail vehicle, wherein the wheel sensor is configured to provide data regarding the speed for processing by at least one of: the fault detector or the remote processing system.

15. The rail wheel evaluation system of claim 14, wherein the wheel sensor, the fault detector, and the remote processing system use a shared communications connection.

16. The rail wheel evaluation system of claim 13, wherein the set of sensors includes:

at least one strain gauge affixed to the object, wherein the impact data includes strain data corresponding to a strain experienced by the object; and at least one accelerometer affixed to the object, wherein the impact data includes acceleration data corresponding to an acceleration experienced by the object.

17. A method of evaluating a force affecting a structure, the method comprising:

affixing an enclosure including an object to the structure, wherein the structure is a single beam, wherein opposing ends of the object are affixed in the enclosure and the object is otherwise unrestrained and a long axis of the object is configured to be spaced from the enclosure and the structure and in parallel with a long axis of the structure;

acquiring, using a set of sensors associated with the object, impact data corresponding to an effect the force affecting the structure has on the object; and processing, by a data processor, the impact data to evaluate for a presence of a set of faults.

18. The method of claim 17, wherein the acquiring includes:

acquiring strain data corresponding to a strain experienced by the object from at least one strain gauge affixed to the object; and acquiring acceleration data corresponding to an acceleration experienced by the object from at least one accelerometer affixed to the object.

19. The method of claim 17, wherein the structure is a single rail of a railroad track, and wherein the set of faults includes a rail wheel flat spot.

20. The method of claim 17, wherein the beam is a rail of a railroad track or a support member of a bridge, and further comprising the data processor receiving at least one of: temperature data or wheel speed data, wherein the processing further includes the data processor processing the at least one of:

temperature data or wheel speed data, to evaluate for the presence of the set of faults.

\* \* \* \* \*